United States Patent
Jung et al.

(10) Patent No.: US 7,751,305 B2
(45) Date of Patent: Jul. 6, 2010

(54) METHOD FOR TRANSMITTING AND RECEIVING BROADCAST SERVICE DATA IN AN OFDMA WIRELESS COMMUNICATION SYSTEM

(75) Inventors: Jung-Soo Jung, Seoul (KR); Jung-Je Son, Seongnam-si (KR); Pan-Yuh Joo, Yongin-si (KR); Dae-Gyun Kim, Seongnam-si (KR); Youn-Sun Kim, Seongnam-si (KR); Beom-sik Bae, Suwon-si (KR); Yu-Chul Kim, Seoul (KR); Yong Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1060 days.

(21) Appl. No.: 11/165,532

(22) Filed: Jun. 24, 2005

(65) Prior Publication Data

US 2006/0009200 A1    Jan. 12, 2006

(30) Foreign Application Priority Data

Jun. 25, 2004  (KR)  ............. 10-2004-0048569
Jul. 8, 2004   (KR)  ............. 10-2004-0053214

(51) Int. Cl.
  *H04J 11/00*   (2006.01)
  *H04J 3/22*    (2006.01)
  *H04L 12/28*   (2006.01)
  *H04H 20/71*   (2008.01)
(52) U.S. Cl. .............. 370/203; 370/312; 370/390; 370/469
(58) Field of Classification Search .......... 370/203, 370/204, 208, 210, 310, 312, 328, 338, 390, 370/432, 442, 469, 535, 537; 455/450, 435.2, 455/435.3
See application file for complete search history.

(56) References Cited

U.S. PATENT DOCUMENTS 5,228,025 A * 7/1993 Le Floch et al. ............ 370/206

(Continued)

FOREIGN PATENT DOCUMENTS

CN         1490937 A         4/2004

(Continued)

OTHER PUBLICATIONS

Son et al., *Enhancement Feature for Robust Multimedia Broadcasting*, Jun. 25, 2004, IEEE 802.16 Broadband Wireless Access Working Group C802.16e-04/169.

(Continued)

*Primary Examiner*—Chi H Pham
*Assistant Examiner*—Warner Wong
(74) *Attorney, Agent, or Firm*—Roylance, Abrams, Berdo & Goodman, L.L.P.

(57) ABSTRACT

A method for providing two or more broadcast services in an orthogonal frequency division multiple access (OFDMA) wireless communication system. The method comprises the steps of separately receiving broadcast services to be transmitted, and independently performing coding, interleaving and modulation on the broadcast services according to a required quality for each of the broadcast services; segmenting each of the modulated broadcast signals into minimum transmission units; time-division-multiplexing the segmented broadcast service signals; configuring a frame comprising information on the broadcast service in physical layer transmission information transmitted together with the broadcast service; and transmitting the frame.

10 Claims, 6 Drawing Sheets

U.S. PATENT DOCUMENTS

| | | | |
|---|---|---|---|
| 5,283,780 A * | 2/1994 | Schuchman et al. | 370/312 |
| 5,592,471 A * | 1/1997 | Briskman | 455/506 |
| 6,501,770 B2 * | 12/2002 | Arsenault et al. | 370/477 |
| 6,888,789 B1 * | 5/2005 | Sakoda et al. | 370/208 |
| 6,975,650 B2 * | 12/2005 | Terry et al. | 370/473 |
| 6,987,780 B2 * | 1/2006 | Wei et al. | 370/469 |
| 7,499,417 B2 * | 3/2009 | Kim et al. | 370/310 |
| 2002/0060984 A1 * | 5/2002 | Michon et al. | 370/208 |
| 2002/0064173 A1 * | 5/2002 | Watanabe | 370/430 |
| 2002/0145985 A1 * | 10/2002 | Love et al. | 370/328 |
| 2002/0154705 A1 | 10/2002 | Walton et al. | |
| 2002/0159430 A1 * | 10/2002 | Atarashi et al. | 370/347 |
| 2002/0191643 A1 * | 12/2002 | Yun et al. | 370/474 |
| 2003/0021271 A1 * | 1/2003 | Leimer et al. | 370/390 |
| 2003/0063595 A1 * | 4/2003 | You et al. | 370/342 |
| 2003/0063606 A1 * | 4/2003 | Odenwalder et al. | 370/389 |
| 2003/0103525 A1 * | 6/2003 | Wahl | 370/465 |
| 2003/0202460 A1 * | 10/2003 | Jung et al. | 370/208 |
| 2004/0003111 A1 * | 1/2004 | Maeda et al. | 709/237 |
| 2004/0223473 A1 * | 11/2004 | Ha et al. | 370/335 |
| 2005/0002363 A1 * | 1/2005 | Cheng et al. | 370/338 |
| 2005/0068908 A1 * | 3/2005 | Qian et al. | 370/278 |
| 2005/0094603 A1 * | 5/2005 | Kim et al. | 370/334 |
| 2005/0143085 A1 * | 6/2005 | Bi et al. | 455/452.2 |
| 2005/0152359 A1 * | 7/2005 | Giesberts et al. | 370/389 |
| 2005/0220065 A1 * | 10/2005 | Kim et al. | 370/342 |
| 2006/0209783 A1 * | 9/2006 | Jain et al. | 370/349 |
| 2006/0239265 A1 * | 10/2006 | Son et al. | 370/390 |
| 2008/0187136 A1 * | 8/2008 | Zhang et al. | 380/270 |
| 2009/0225693 A1 * | 9/2009 | Yi et al. | 370/312 |

FOREIGN PATENT DOCUMENTS

| | | |
|---|---|---|
| EP | 1087583 | 3/2001 |
| JP | 11-215092 | 8/1999 |
| JP | 2004-503181 | 1/2004 |
| JP | 2007-528662 | 10/2007 |

OTHER PUBLICATIONS

Son et al., *Enhancement Feature for Robust Multimedia Broadcasting*, Jul. 7, 2004, IEEE 802.16 Broadband Wireless Access Working Group C802.16e-04/169r1.

Son et al., *Enhancement Feature for Robust Multimedia Broadcasting*, Jul. 15, 2004, IEEE 802.16 Broadband Wireless Access Working Group C802.16e-04/169r2.

Son et al., *Enhancement Feature for Robust Multimedia Broadcasting*, Aug. 17, 2004, IEEE 802.16 Broadband Wireless Access Working Group C802.16e-04/282.

* cited by examiner

METHOD FOR TRANSMITTING AND RECEIVING BROADCAST SERVICE DATA IN AN OFDMA WIRELESS COMMUNICATION SYSTEM

PRIORITY

This application claims the benefit under 35 U.S.C. §119 (a) of an application entitled "Method for Transmitting and Receiving Broadcast Service Data in an OFDMA Wireless Communication System" filed in the Korean Intellectual Property Office on Jun. 25, 2004 and assigned Serial No. 2004-48569, and an application entitled "Method for Transmitting and Receiving Broadcast Service Data in an OFDMA Wireless Communication System" filed in the Korean Intellectual Property Office on Jul. 8, 2004 and assigned Serial No. 2004-53214, the entire contents of which are incorporated herein by reference.

BACKGROUND OF THE INVENTION

1. Field of the Invention

The present invention relates generally to a method for transmitting and receiving broadcast service data in a wireless communication system. In particular, the present invention relates to a method for transmitting and receiving broadcast service data in an Orthogonal Frequency Division Multiple Access (OFDMA) wireless communication system.

2. Description of the Related Art

A cellular mobile communication system is a typical wireless communication system. The mobile communication system uses a multiple access scheme to simultaneously communicate with a plurality of users. The multiple access scheme used in the mobile communication system typically includes a Time Division Multiple Access (TDMA) scheme and a Code Division Multiple Access (CDMA) scheme. With the rapid progress of communication technology, the CDMA mobile communication system has been evolving from a system for mainly supporting voice communication into a system capable of transmitting high-speed packet data.

However, due to limited code resources, the CDMA mobile communication system has difficulty in transmitting an increasing amount of multimedia data. Accordingly, there is a need for a multiple access scheme capable of identifying an increased number of users and transmitting an increased amount of data to the users. A multiple access scheme proposed to meet the need is the Orthogonal Frequency Division Multiple Access (OFDMA) scheme. The OFDMA scheme identifies users with a plurality of orthogonal subchannels, and transmits data over the orthogonal subchannels.

For high-speed data transmission, a cellular system using the OFDMA scheme (hereinafter referred to as an "OFDMA cellular system") has been proposed. Research into the OFDMA scheme is being conducted by an Institute of Electrical and Electronic Engineers (IEEE) 802.16d standardization committee to provide a high-speed wireless Internet service. The 802.16 system supports a high-speed service at a data rate higher than that of a $3^{rd}$ generation (3G) mobile communication system, and implements the high-speed service using a transmission scheme such as an Orthogonal Frequency Division Multiplexing (OFDM) scheme and advanced antenna techniques such as a Multiple Input Multiple Output (MIMO) antenna technique and a smart antenna technique in addition to several physical layer techniques used in the 3G mobile communication system.

However, the conventional 802.16 high-speed wireless communication system transmits data to individual mobile stations on a unicast basis, and recently, a technique of transmitting and receiving data for a broadcast service provided in the 3G mobile communication system tends to be applied to the 802.16 system.

A description will now be made of a process of processing a broadcast service transmitted from a physical layer in the current mobile communication system wherein the broadcast service is provided through a downlink channel.

Figure 1:
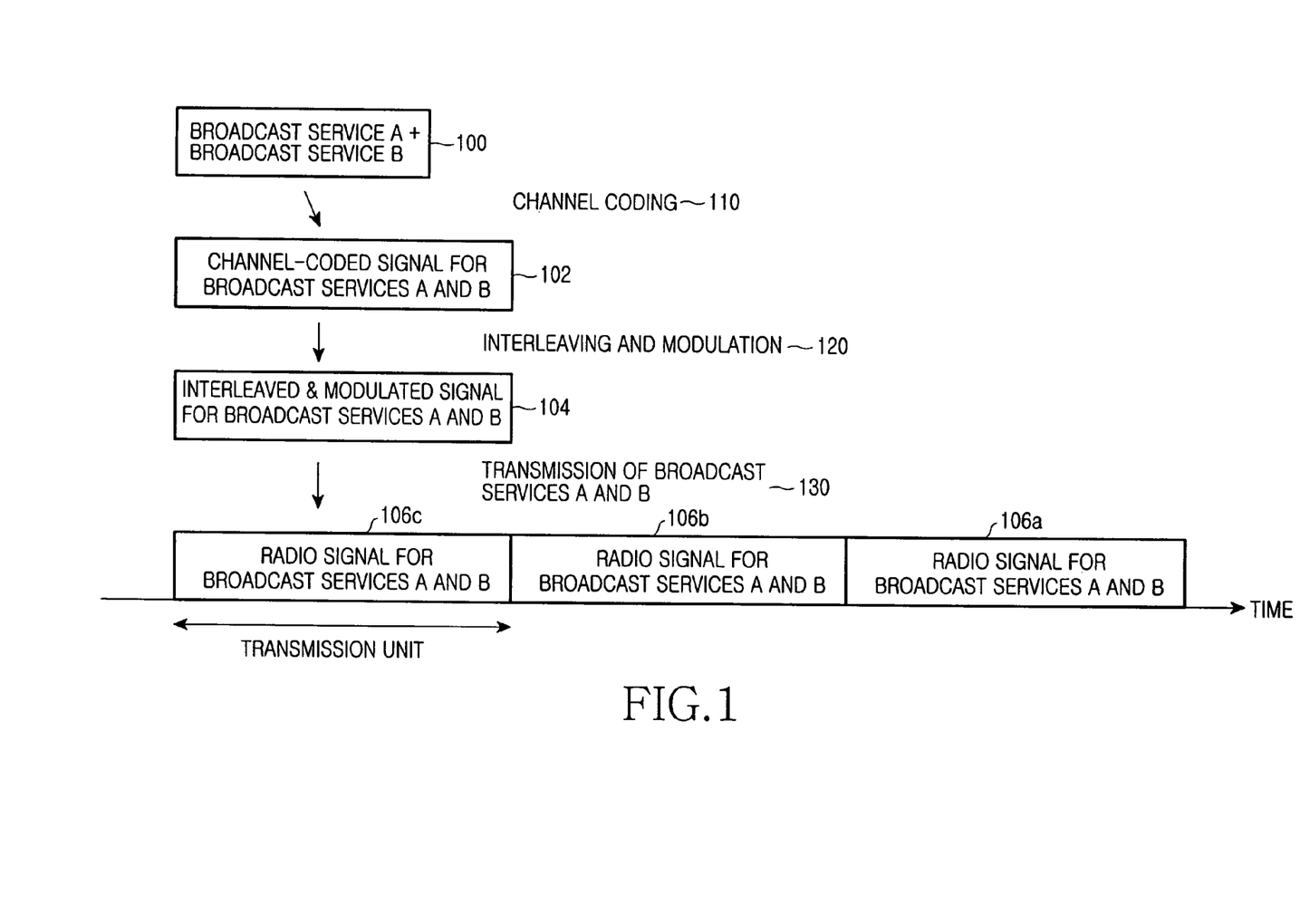
FIG. 1 is a signaling diagram illustrating a process of processing a broadcast service transmitted from a physical layer in a mobile communication system wherein the broadcast service is provided through a downlink.

FIG. 1 is a signaling diagram illustrating a process of processing a broadcast service transmitted from a physical layer in a mobile communication system wherein the broadcast service is provided through a downlink channel.

It is assumed in FIG. 1 that a particular base station transmits broadcast service data for a broadcast service A and a broadcast service B. In this case, mixed data 100 in which the broadcast service A and the broadcast service B coexist as broadcast traffic. In step 110, the mixed data 100 for the two different broadcast services A and B is subject to channel coding. Thereafter, in step 120, a channel-coded signal 102 for the two different broadcast services is subject to interleaving and modulation. In step 130, an interleaved and modulated signal 104 for the two different broadcast services is mapped to a transmission channel through a transmission process for the broadcast services. In this manner, a radio signal for the broadcast services A and B is transmitted over transmission channels 106a, 106b and 106c. The radio signal is transmitted per predetermined transmission unit.

The foregoing method may have the following problems when mixed broadcast service data is transmitted. First, because broadcast information A and broadcast information B were encoded together, even though a mobile station desires to receive one of the broadcast information A and the broadcast information B, it must receive both a radio signal for the broadcast service A and a radio signal for the broadcast service B and then decode the received radio signals. Second, a transmission time period for the broadcast traffic is too short, making it difficult to maximally improve transmission performance by using time diversity.

Generally, the broadcast service unidirectionally transmits downlink signals to a plurality of mobile stations. Therefore, the broadcast service can rarely undergo downlink power control, and in order to overcome a fading radio channel, a transmission time period should be longer than a coherence time of a radio channel to obtain sufficient time diversity. In this case, however, sufficient time diversity cannot be obtained. A description thereof will be made with reference to FIG. 2.

Figure 2:
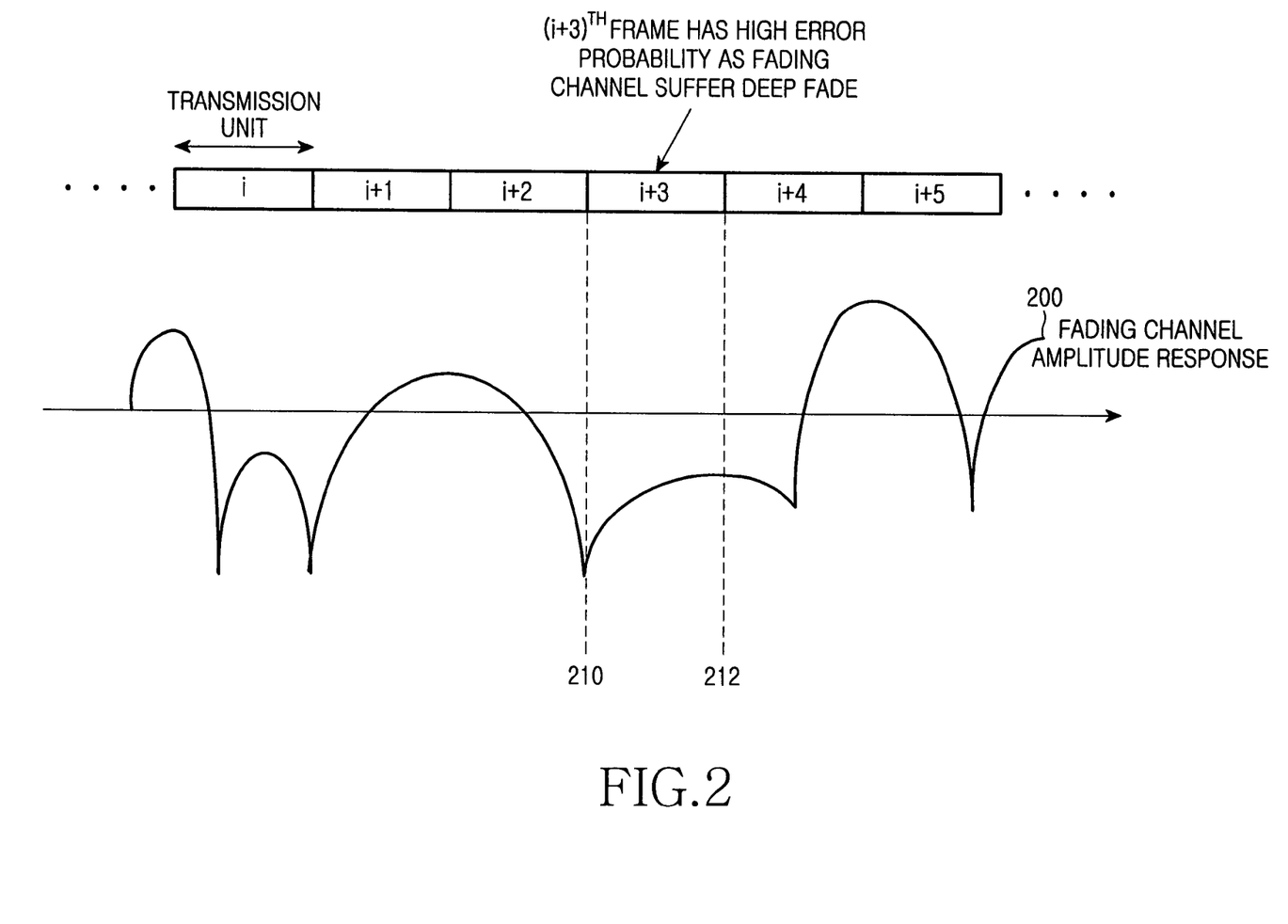
FIG. 2 is a timing diagram for a description of a relationship between a change in channel fading and transmission data.

FIG. 2 is a timing diagram for a description of a relationship between a change in channel fading and transmission data. Each of transmission unit-based frames shown in an upper part of FIG. 2 represents a downlink packet transmitted from a base station. Herein, because a description of the broadcast service is being made, it will be assumed that the packet is a mixed radio signal for different broadcast services as described in connection with FIG. 1. That is, mixed radio signals in each of which different broadcast services coexist are transmitted in the order of i, i+1, i+2, i+3, i+4, i+5, . . . , as shown in FIG. 2. In addition, it will be assumed that an amplitude response characteristic 200 of a time-varying fading channel has a curve shown in a lower part of FIG. 2. An $(i+3)^{th}$ radio frame transmitted from a time 210 to a time 212 has a very high frame error probability. That is, the radio signal cannot have sufficient time diversity, thereby deteriorating reception performance.

In other words, in FIG. 2, as the $(i+3)^{th}$ frame of a transmission broadcast signal suffers a so-called "deep fade" in which a radio channel is rapidly deteriorated by fading, a received signal-to-noise ratio is very low. As a result, a frame error probability of the transmission broadcast signal is very high. A third problem of the transmission method of FIG. 1 is as follows. Because broadcast signals A and B are encoded and modulated together, it is impossible to allow them to have their own unique performances. That is, assuming that the broadcast information A is information for a broadcast service for the overall service area of the base station and the broadcast information B is information for only a particular area with a good channel environment in the entire service area of the base station, it is impossible to enable the broadcast information A and B to have their own unique performances because the broadcast information A and the broadcast information B are simultaneously encoded and modulated as described with reference to FIG. 1.

SUMMARY OF THE INVENTION

It is, therefore, an object of the present invention to provide a broadcast service data transmission and reception method capable of providing unique performance for each broadcast service when different broadcast services are simultaneously provided.

It is another object of the present invention to provide a broadcast service data transmission and reception method capable of obtaining a time diversity effect for each broadcast service when different broadcast services are simultaneously provided.

It is further another object of the present invention to provide a broadcast service data transmission and reception method capable of selectively receiving the broadcast service data desired by a user.

According to one aspect of the present invention, there is provided a method for providing two or more broadcast services in an orthogonal frequency division multiple access (OFDMA) wireless communication system. The method comprises the steps of separately receiving broadcast services to be transmitted, and independently performing coding, interleaving and modulation on the broadcast services according to a required quality for each of the broadcast services; segmenting each of the modulated broadcast signals into minimum transmission units; time-division-multiplexing the segmented broadcast service signals; configuring a frame comprising information on the broadcast service in physical layer transmission information transmitted together with the broadcast service; and transmitting the frame.

According to another aspect of the present invention, there is provided a method for receiving a broadcast service in a wireless communication system in which two or more broadcast services are subject to time division multiplexing using an orthogonal frequency division multiple access (OFDMA) scheme, and information on the broadcast service comprising physical layer transmission information is for one frame. The method comprises the steps of receiving the physical layer transmission information of the frame, and acquiring information on a described broadcast service by demodulating and decoding the received physical layer transmission information; receiving broadcast service data in the frame at a transmission time of a broadcast service acquired from the physical layer transmission information; demodulating and deinterleaving the received broadcast service data according to a scheme acquired from the physical layer transmission information, combining the deinterleaved data with another subpacket transmitted on a time division basis; and decoding the combined data.

BRIEF DESCRIPTION OF THE DRAWINGS

The above and other objects, features and advantages of the present invention will become more apparent from the following detailed description when taken in conjunction with the accompanying drawings in which.

Throughout the drawings, the same or similar elements, features and structures are represented by the same reference numerals.

DETAILED DESCRIPTION OF EXEMPLARY EMBODIMENTS

Several embodiments of the present invention will now be described in detail with reference to the accompanying drawings. In the following description, a detailed description of known functions and configurations incorporated herein has been omitted for conciseness.

Figure 3:
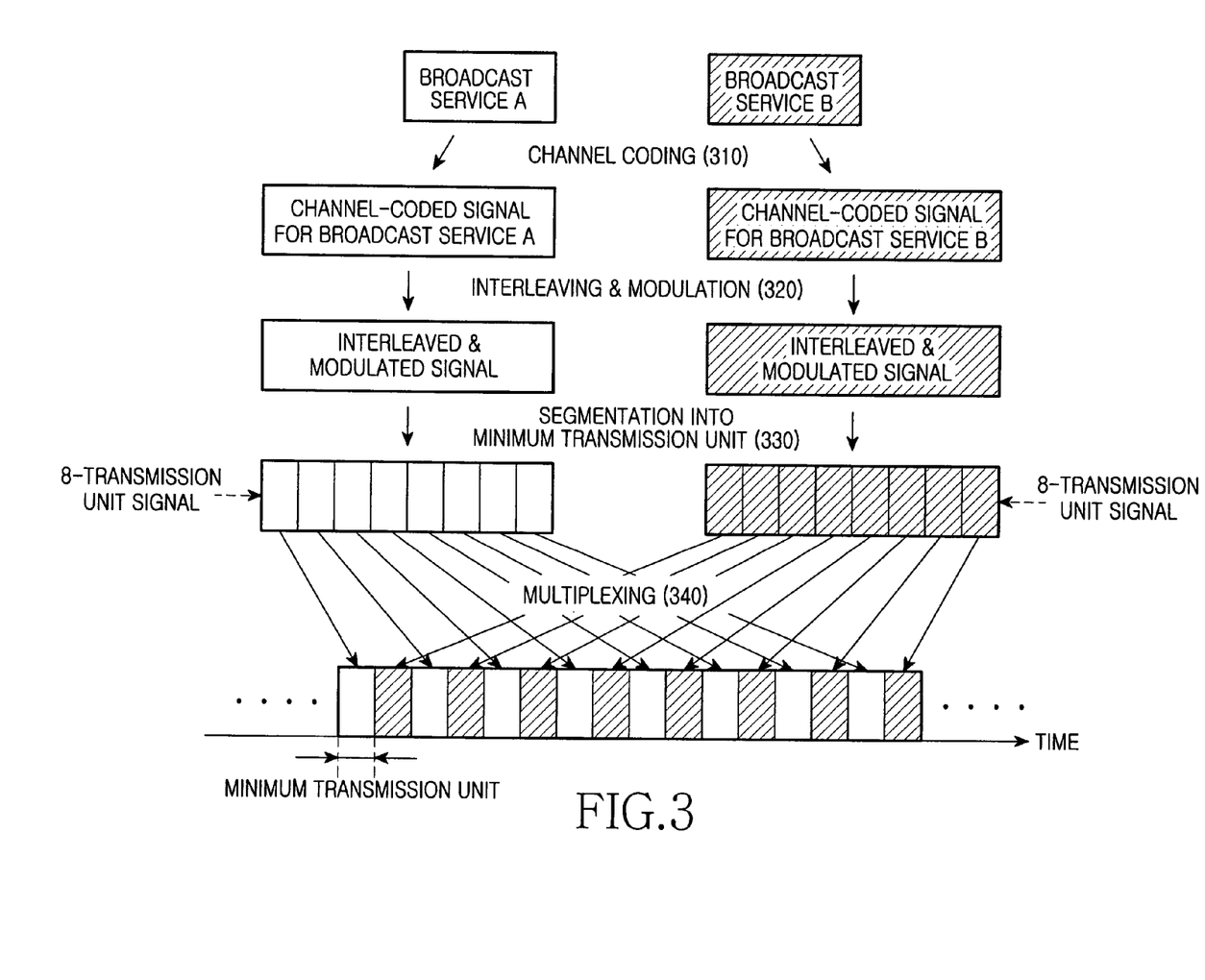
FIG. 3 is a diagram illustrating a process of generating a transmission signal for information for two different broadcast services in a mobile communication system according to an embodiment of the present invention.

FIG. 3 is a diagram illustrating a process of generating a transmission signal for information for two different broadcast services in a mobile communication system according to an embodiment of the present invention. With reference to FIG. 3, a detailed description will now be made of a process of providing different broadcast services in a mobile communication system according to an embodiment of the present invention.

According to an embodiment of the present invention, a base station providing broadcast services receives broadcast services separately without processing broadcast services by mixing the broadcasts. FIG. 3 illustrates a process of receiving independent packets for a broadcast service A and a broadcast service B in this manner. After independently receiving packets for the broadcast service A and the broadcast service B, the base station performs channel coding on the broadcast services with independent coding schemes in step 310. Generally, channel coding schemes defined in the system are used for the channel coding. However, the channel coding schemes are not restricted by the present invention. Instead, the present invention is characterized in that data for the broadcast services is separately channel-coded.

After separately channel-coding both a packet for the broadcast service A and a packet for the broadcast service B, the base station independently interleaves and modulates the encoded broadcast service packets in step 320. After completion of the modulation, the base station segments each of the broadcast service packets into 8 transmission units in step 330. It is assumed herein that a broadcast service packet is segmented into 8 transmission units by way of example. However, the number of transmission units into which the broadcast service packet is segmented is subject to change. In this manner, the transmission unit is set to a minimum transmission unit. Therefore, a size of each segment is determined based on a time of the minimum transmission unit, a data rate available in the minimum transmission unit, and/or a size of a modulated packet. Alternatively, the segmentation into the minimum transmission units in step 330 can be applied to the encoded signals or the interleaved signals. In this case, the interleaving and modulation process is applied after the segmentation into the minimum transmission units.

After completion of the segmentation, the base station performs multiplexing in step 340. The multiplexing is performed such that the segmented broadcast service signals are transmitted sequentially or within a predetermined time. It is assumed in FIG. 3 that only two broadcast services are provided and the two broadcast services transmit the same amount of data on an alternating basis. However, it should be appreciated by those skilled in the art that any number of broadcast services may be used without departing from the scope of the present invention. For example, the broadcast services may require different qualities or require an increased amount of data. In this case, the broadcast service signals can be transmitted an increased number to match the increased amount of data. When three or more different broadcast services are transmitted, signals for each of the broadcast services are sequentially transmitted. Also, in this case, broadcast services can be independently transmitted one by one according to a required quality for the broadcast service or an amount of data to be transmitted. That is, in a specific period for which another broadcast service is transmitted once, a particular service can be transmitted a greater number of times (or with a larger amount of broadcast information), as compared with said another broadcast service.

Compared with the conventional method of consecutively transmitting minimum transmission units in transmitting broadcast services having different amounts of data, the novel method can acquire a time diversity effect by inserting the minimum transmission units into different broadcast services. This will be described with reference to a case where three broadcast services are transmitted.

Assuming that a broadcast service A should be transmitted once every 4 minimum transmission units, a broadcast service B should be transmitted once every 2 minimum transmission units, and a broadcast service C should be transmitted once every 4 minimum transmission units. In this case, the broadcast services can be transmitted in the following order.

Example 1 broadcast service B→broadcast service A→broadcast service B→broadcast service C→broadcast service B→broadcast service A → . . .

Example 2 broadcast service B→broadcast service C→broadcast service B→broadcast service A→broadcast service B→broadcast service C → . . .

Referring to FIG. 3, compared with the conventional broadcast service transmission method of FIG. 1, the novel broadcast service transmission method of FIG. 3 has the following advantages. First, because the broadcast information A and the broadcast information B undergo independent channel coding processes, a mobile station receiver can selectively receive a radio signal for the broadcast information A and decode the received radio signal. Second, because a radio signal for the broadcast information A and a radio signal for the broadcast information B are time-multiplexed, the novel method is two times greater than the conventional method in terms of the time diversity effect. Third, because the broadcast information A and the broadcast information B are subject to independent interleaving and modulation processes, the broadcast information A and the broadcast information B can be set such that they have their own unique data rates and performances.

A description of a gain will now be made herein below. Assuming that broadcast information A is transmitted at a data rate of 100 Kbps using a coding rate of 0.2 and a quadrature phase shift keying (QPSK) modulation scheme and broadcast information B is transmitted at a data rate of 400 Kbps using a coding rate of 0.4 and a 16-ary quarature amplitude modulation (16QAM) modulation scheme. In this case, the broadcast information A can service a wider area at a lower data rate while the broadcast information B can service a narrower area at a higher data rate. In this manner, it is possible to extend service areas and set data rates separately for the broadcast services, contributing to efficient operation of the mobile communication system. The broadcast information A and B can either comprise totally different information like different TV channels, or comprise information having different image or audio qualities for the same information. That is, for one TV channel, broadcast information created to provide normal image and audio qualities and broadcast information created to provide high image and audio qualities are independently subject to channel coding, interleaving, and modulation. In this case, in an area with a poor radio channel environment, a mobile station receives broadcast information created such that broadcast information having normal image and audio qualities can be received even at a low signal-to-noise ratio (SNR). In an area with a good radio channel environment, the mobile station receives broadcast information created such that broadcast information having high image and audio qualities can be received only at a high SNR.

Figure 4:
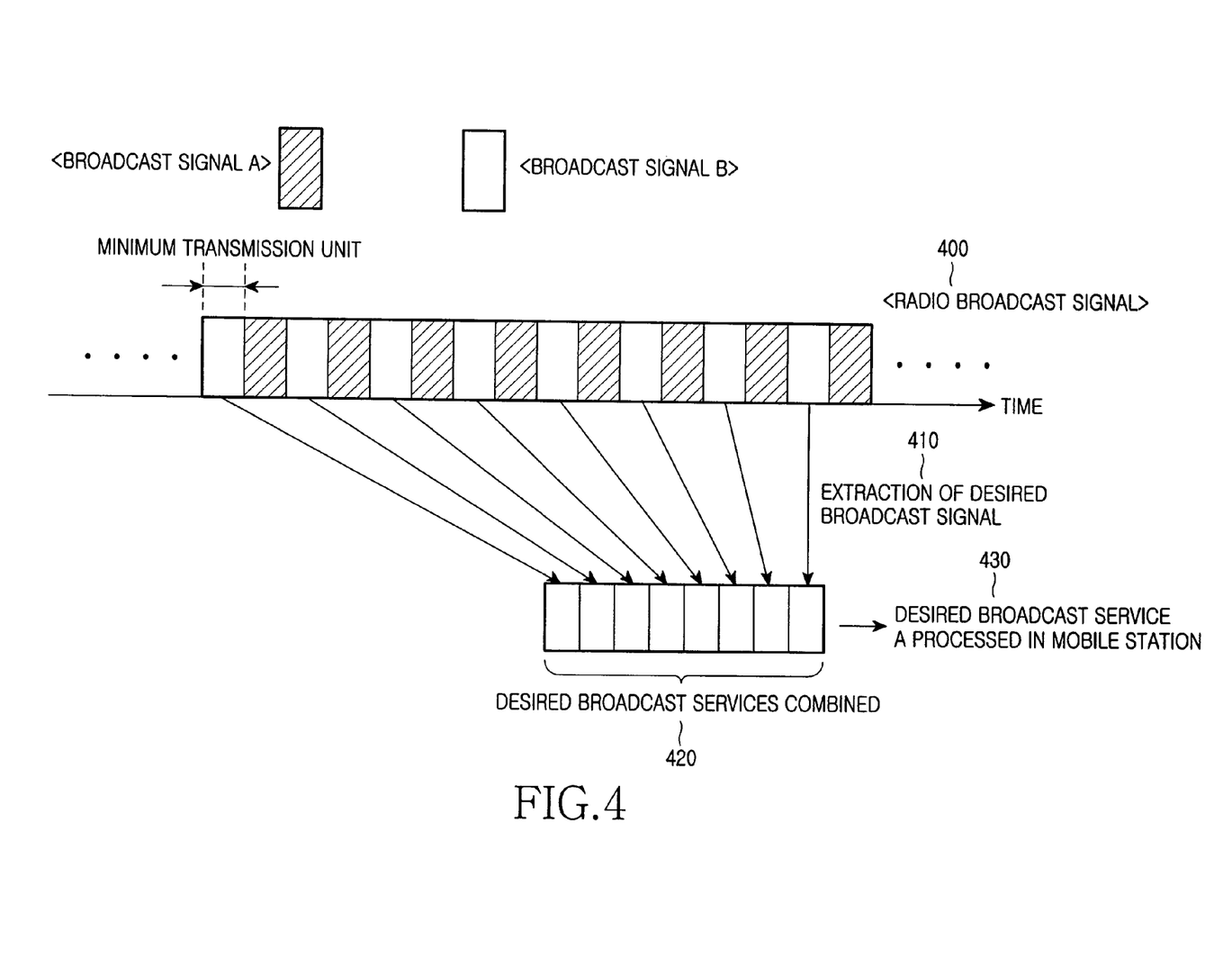
FIG. 4 is a diagram illustrating a process of receiving desired broadcast information in a mobile communication system in which broadcast service signals are time-multiplexed before being transmitted according to an embodiment of the present invention.

FIG. 4 is a diagram illustrating a process of receiving desired broadcast information in a mobile communication system in which broadcast service signals are time-multiplexed before being transmitted according to an embodiment of the present invention.

It is assumed in FIG. 4 that a base station has segmented signals for a broadcast service A and a broadcast service B, which underwent channel coding, interleaving, and modulation, into 8 minimum transmission units. In this case, a mobile station desiring to receive the broadcast information A selectively receives a signal for the broadcast information A from among the signals for the broadcast information A and the broadcast information B, which were time-multiplexed as shown in FIG. 4, combines all of the signals generated by the same channel coding, interleaving, and modulation, and performs a reception process on the combined signal. A detailed description thereof will be made herein below.

When a time-multiplexed radio broadcast signal 400 is transmitted, a mobile station selectively receives only its desired transmission-unit frames. That is, in step 410, the mobile station selectively extracts only its desired broadcast signals. In step 420, the mobile station combines the received desired broadcast information frames. In step 430, the mobile station demodulates and decodes the combined signal, thereby receiving the desired broadcast service A.

A description will now be made of a method for transmitting broadcast services and identifying broadcast packets.

In order to support broadcast services, the high-speed wireless communication system providing at unicast should be able to determine whether a physical layer frame transmitted from a base station comprises a broadcast packet and whether a particular packet is a broadcast packet. To this end, a base station informs mobile stations of a transmission time of each broadcast packet through a control message, or writes in an inclusion of broadcast information in a physical layer frame over which the corresponding packet is transmitted, and broadcasts the information, thereby indicating a physical layer frame over which a broadcast service is transmitted.

As a method for identifying broadcast service packets, the 802.16 system to which an embodiment of the present invention is applied can use a method for allocating unique connection identifiers (CIDs) to broadcast services, and writing broadcast information with its CID in a physical layer transmission information (DL-MAP) part that is included in every transmission frame, before transmission. A mobile station, receiving a particular frame, receives physical layer transmission information of the corresponding frame and determines whether a CID corresponding to its desired broadcast service is included in the received physical layer transmission information. If the CID corresponding to its desired broadcast service is included in the received physical layer transmission information, the mobile station can receive the desired broadcast service through the symbol and subchannel over which the corresponding CID is transmitted.

A format of the physical layer transmission information is shown in Table 1 below.

TABLE 1

| Syntax | Size |
| --- | --- |
| DL-MAP_IE( ) { | |
|   DIUC | 4 bits |
|   if (DIUC == 15) { | |
|     Extended DIUC dependent IE | variable |
|   } else { | |
|     if (INC_CID == 1) { | |
|       N_CID | 8 bits |
|       for (n=0; n<N_CID; n++) { | |
|         CID | 16 bits |
|       } | |
|     } | |
|     OFDMA Symbol offset | 10 bits |
|     Subchannel offset | 5 bits |
|     Boosting | 3 bits |
|     No. OFDMA Symbols | 9 bits |
|     No. Subchannels | 5 bits |
|   } | |
| } | |

Table 1 shows a format of the general physical layer transmission information used in the 802.16 system. A Downlink Interval Usage Code (DIUC) field, a field indicating a transmission type commonly used in the 802.16 system, indicates a downlink transmission type of a channel specified in the physical layer transmission information. An INC_CID field indicates whether a CID is included in the corresponding physical layer transmission information. A N_CID field indicates the number of CIDs included in the corresponding physical layer transmission information. A CID field indicates a CID of the data transmitted in a frame indicated by the physical layer transmission information. An OFDMA symbol offset field indicates a start point of an OFDMA symbol where the corresponding data is transmitted in a frame. A No. OFDMA symbols field indicates the number of the OFDMA symbols. A Subchannel offset field indicates a start point of a channel over which the corresponding data is transmitted. A No. Subchannels field indicates the number of the subchannels. A Boosting field indicates an additional power level used for transmission of the corresponding data.

As a method for indicating a point of a broadcast service packet in a physical layer frame, an embodiment of the present invention presents a method for defining broadcast physical layer transmission information (Broadcast DL-MAP) used for writing broadcast-related information therein in addition to the physical layer transmission information, and including the broadcast physical layer transmission information. The broadcast physical layer transmission information can be included when the DIUC field among the fields of the physical layer transmission information is set to 15, for example, and a format thereof is shown in Table 2.

TABLE 2

| Syntax | Size |
| --- | --- |
| Broadcast_DL-MAP_IE { | |
|   Extended DIUC | 4 bits |
|   Length | 4 bits |
|   For(i=0;i<N_CID;i++){ | |
|     CID | 16 bits |
|     SPID | 4 bits (or 2 bits used) |
|     OFDMA Symbol Offset | 8 bits |
|     Subchannel Offset | 6 bits |
|     No. OFDMA Symbols | 7 bits |
|     No. Subchannels | 6 bits |
|     DIUC | 4 bits |
|   } | |
| } | |

Table 2 shows a format of the broadcast physical layer transmission information newly defined in the 802.16 system according to an embodiment of the present invention. In the format of the broadcast physical layer transmission information, an Extended DIUC field is an indicator for indicating the broadcast physical layer transmission information among various extended physical layer transmission information. Therefore, a mobile station, receiving physical layer transmission information with DIUC=15, can recognize the inclusion of extended physical layer transmission information in the physical layer transmission information. The mobile station reads an Extended DIUC field from the extended physical layer transmission information, and if its value is an indicator corresponding to broadcast physical layer transmission information, the mobile station can analyze the corresponding extended physical layer transmission information as broadcast information.

A Length field in the broadcast physical layer transmission information indicates a size of included broadcast physical layer transmission information. A N_CID field indicates the number of included broadcast CIDs and its value can be determined from a value of the Length field. The broadcast physical layer transmission information includes information on N_CID broadcast CIDs. A CID field indicates CIDs used for identifying broadcast services included in the corresponding broadcast physical layer transmission information. An OFDMA Symbol Offset field indicates a symbol position in a frame over which broadcast information with a corresponding broadcast CID is transmitted, and a No. OFDMA Symbols field indicates how many symbols the corresponding broadcast information is transmitted in in the corresponding position. A Subchannel Offset field indicates a start point of a frequency-domain channel over which broadcast information with a corresponding broadcast CID is transmitted, and a No. Subchannels field indicates how many channels are occupied in a corresponding start channel. A DIUC field indicates a transmission type popularly used in the 802.16 system.

A SPID field indicates a subpacket identifier (SPID) of a corresponding broadcast CID included in the current frame when one broadcast packet is segmented into several transmission units, or subpackets, before being transmitted. If one broadcast packet is segmented into 8 subpackets and a third subpacket is transmitted in the current frame as described with reference to FIG. 3, a SPID field of the corresponding broadcast CID has a value of 2, and a SPID of a first subpacket has a value of 0. A mobile station, receiving a broadcast subpacket with SPID=2 of a corresponding CID, determines whether it has successfully received broadcast information by combining previously received subpackets 0 and 1 of the CID with a currently received subpacket in a code level. The broadcast physical layer transmission information defined in the present invention provides information used for indicating whether broadcast information is included in a frame transmitted in the 802.16 system, and further provides a method for identifying subpackets when a particular broadcast service is transmitted on a time division basis.

A generalized format of the broadcast physical layer transmission information (Broadcast DL-MAP) provided in an embodiment of the present invention is shown in Table 3.

TABLE 3

| Syntax | Size |
| --- | --- |
| Broadcast_DL-MAP_IE { | |
| Extended DIUC | 4 bits |
| Length | 4 bits |
| For(i=0;i<N_CID;i++){ | |
| CID | 16 bits |
| SPID | 4 bits (or 2 bits used) |
| ACID | 2 bits |
| AISN | 1 bits |
| OFDMA Symbol Offset | 8 bits |
| Subchannel Offset | 6 bits |
| No. OFDMA Symbols | 7 bits |
| No. Subchannels | 6 bits |
| DIUC | 4 bits |
| } | |
| } | |

Table 3 shows a generalized format of broadcast physical layer transmission information comprising an ARQ Channel Identifier (ACID) field and an ARQ Identifier Sequence Number (AISN) field in addition to the format of Table 2. The ACID field indicates the number of broadcast packets that can be consecutively transmitted in a broadcast service identified by the same CID. In the broadcast service identified by the same CID, if there is no ACID field in the broadcast physical layer transmission information, a base station cannot transmit the next broadcast packet until it transmits all of the subpackets obtained by time-dividing one broadcast packet. If two broadcast packets belonging to one broadcast CID are time-divided into subpackets and the subpackets are consecutively transmitted, a mobile station receiving the subpackets cannot determine to which of the two broadcast packets the received packets belong. Therefore, the ACID field can be used for identifying broadcast packets that were transmitted consecutively or simultaneously, and the mobile station can identify the consecutively or simultaneously received broadcast subpackets using the ACID.

Assuming that when broadcast packets 1 and 2 belonging to one broadcast CID are each segmented into 4 subpackets 1-1, 1-2, 1-3, 1-4 and 2-1, 2-2, 2-3, 2-4, respectively, before being transmitted, an ACID of broadcast physical layer transmission information corresponding to the subpackets 1-1, 1-2, 1-3, 1-4 is set to 0 and an ACID of broadcast physical layer transmission information corresponding to the subpackets 2-1, 2-2, 2-3, 2-4 is set to 1 before being transmitted.

A mobile station, receiving subpackets in the order of 1-1, 2-1, 2-2, 1-2, 1-3, 2-3, 2-4, 1-4, can recognize that a first subpacket is a subpacket with SPID=0 for ACID=0 and a second subpacket is a subpacket with SPID=0 for ACID=1. The mobile station, consecutively receiving the subpackets, combines subpackets transmitted with the same ACID, thereby improving reception performance. With the use of the ACID, different broadcast packets for one broadcast service can be mixed before being transmitted, maximizing time division effect.

The AISN field indicates sequence information of broadcast packets transmitted with the corresponding ACID. When broadcast packets transmitted with the corresponding ACID have changed, a base station changes a value of the AISN field. If the AISN field changes from 0 to 1, or 1 or 0, changing the sequence information, the mobile station can determine that broadcast packets transmitted with the corresponding ACID have changed, empties a buffer corresponding to the ACID, and stores subpackets for the next broadcast packet in the buffer. With the use of the AISN, the base station can transmit the next broadcast packet even before it transmits all of the predetermined broadcast subpackets, ensuring flexible and variable broadcast information transmission.

An embodiment of the present invention provides a method for including a broadcast CID and a broadcast SPID in a Hybrid Automatic Repeat reQuest (HARQ) message, which is a media access control (MAC) layer message, before transmission, in addition to the method for identifying subpackets of a broadcast packet transmitted using the physical layer transmission information and the broadcast physical layer transmission information. Further, an embodiment of the present invention provides a method in which a mobile station can receive a broadcast packet using information on the message and identify SPIDs thereof.

Table 4 below shows a format of a HARQ message defined in the 802.16 system. A base station transmits the message shown in Table 4 on a broadcast basis in order to transmit HARQ information to mobile stations supporting HARQ. Therefore, a mobile station supporting HARQ receives a HARQ message included in a transmitted physical layer frame, and determines whether its own CID is included therein. If its own CID is included therein, the mobile station determines that the corresponding HARQ information is its own reception information. The mobile station receives transmitted HARQ subpackets using the information.

TABLE 4

| Syntax | Size |
| --- | --- |
| HARQ-MAP message format( ) { | |
| H-ARQ MAP Indicator = 111 | 3 bits |
| H-ARQ_UL-MAP appended | 1 bit |
| CRC appended | 1 bit |
| MAP message length | 9 bits |
| DL IE count | 6 bits |
| for (i=0; i<DL IE count; I++) { | |
| Compact DL-MAP IE( ) | variable |
| } | |
| If(H-ARQ_UL-MAP appended == 1) { | |
| while(map data remains) { | |
| Compact UL-MAP IE( ) | |
| } | |
| } | |
| if(!byte boundary) { | |
| Padding nibble | |
| } | |
| } | |

In the message of Table 4, a H-ARQ MAP Indicator field is a message indicator for indicating that this message is a HARQ message, and H-ARQ MAP Indicator=111 indicates a HARQ message. A H-ARQ_UL-MAP appended field indicates that uplink transmission information is included in addition to downlink transmission information, and when the H-ARQ_µL-MAP appended field is set to 1, uplink HARQ-related information is included in the message. A CRC appended field indicates that a HARQ message and a 32-bit CRC for the message are transmitted together. If the CRC appended field is set to 1, the HARQ message and a 32-bit CRC added to an end thereof are transmitted together. A MAP message length field indicates a length of a HARQ message, and when the HARQ message is transmitted together with a CRC, the MAP message length field indicates a length comprising a length of the CRC. A DL IE count field indicates how many HARQ information elements (IEs) are included before being transmitted. The HARQ message comprises as many Compact DL-MAP IEs (uplink transmission information) as a value indicated by the DL IE count field. If the H-ARQ_UL-MAP appended field of the HARQ message is set to 1, Compact UL-MAP (downlink transmission information) is included in the remaining part of the message.

The downlink transmission information (Compact DL-MAP) can express various types of downlink HARQ information. An embodiment of the present invention provides a method for transmitting broadcast packet information using extended downlink transmission information of the downlink transmission information. A format of the extended downlink transmission information is shown in Table 5.

TABLE 5

| Syntax | Size |
| --- | --- |
| Compact_DL-MAP_IE { | |
| DL-MAP Type = 7 | 3 bits |
| DL-MAP sub-type | 5 bits |
| Length | 4 bits |
| Payload | variable |
| } | |

Table 5 shows a format of the extended downlink transmission information. In the extended downlink transmission information, a DL-MAP Type field is an indicator for indicating that downlink transmission information included in a HARQ message is extended downlink transmission information, and DL-MAP Type=7 indicates extended downlink transmission information. A DL-MAP sub-type field indicates a type of extended downlink transmission information, and in an 802.16 standard, all values are reserved without a definition of a detailed type of the extended downlink transmission information. A Length field indicates a length of extended downlink transmission information, and an extended downlink transmission information block with a designated length is included in a Payload field.

In an embodiment of the present invention, extended downlink transmission information with DL-MAP sub-type=0 is defined as downlink time diversity information TimeDiversity_MBS_DL-MAP that expresses transmission information of a broadcast packet. Table 6 below shows a format of the downlink time diversity information defined in the present invention. The downlink time diversity information comprises N_CID broadcast packet transmission information elements, and a value of the N_CID can be determined depending on a Length field specified in the extended downlink transmission information. A CID field of the downlink time diversity information indicates a CID of an included broadcast packet, and a Subchannel Offset field indicates a position in a frame, where broadcast information with a corresponding CID is transmitted. A $N_{EP}$ code field and an $N_{SCH}$ code field, fields indicating a coding technique and a modulation/demodulation technique used in the 802.16 system, indicate a coding technique and a modulation/demodulation technique used for transmission of the corresponding broadcast subpackets. SPID, ACID, and AI_SN fields, having the same meaning as those described with reference to Table 2 and Table 3, indicate a SPID for each broadcast subpacket, an ID of an ARQ channel over which the subpacket is transmitted, and an ARQ sequence number, respectively.

TABLE 6

| Syntax | Size |
| --- | --- |
| TimeDiversity_MBS_DL-MAP_IE { | |
| for(i=0; i<N_CID; i++) { | |
| CID | 16 bits |
| Subchannel Offset | 12 bits |
| NEP code | 4 bits |
| NSCH code | 4 bits |
| AI_SN | 1 bits |
| SPID | 2 bits |
| ACID | 4 bits |
| reserved | 5 bits |
| } | |
| } | |

Upon receiving a particular physical layer frame, a mobile station that supports HARQ and desires to receive a broadcast service, should determine whether a HARQ message is included in the frame. If the HARQ message is included in the frame, the mobile station determines whether a CID of its desired broadcast service is included using downlink time diversity information included in the HARQ message. If the CID of its desired broadcast service is included, the mobile station can receive a broadcast subpacket corresponding to a SPID using designated coding and modulation/demodulation methods in a designated position using time diversity information corresponding to the CID.

A description will now be made of control processes performed between a base station and a mobile station according to an embodiment of the present invention. It will be assumed herein that the simplified format of Table 2 is used for the broadcast physical layer transmission information.

Figure 5:
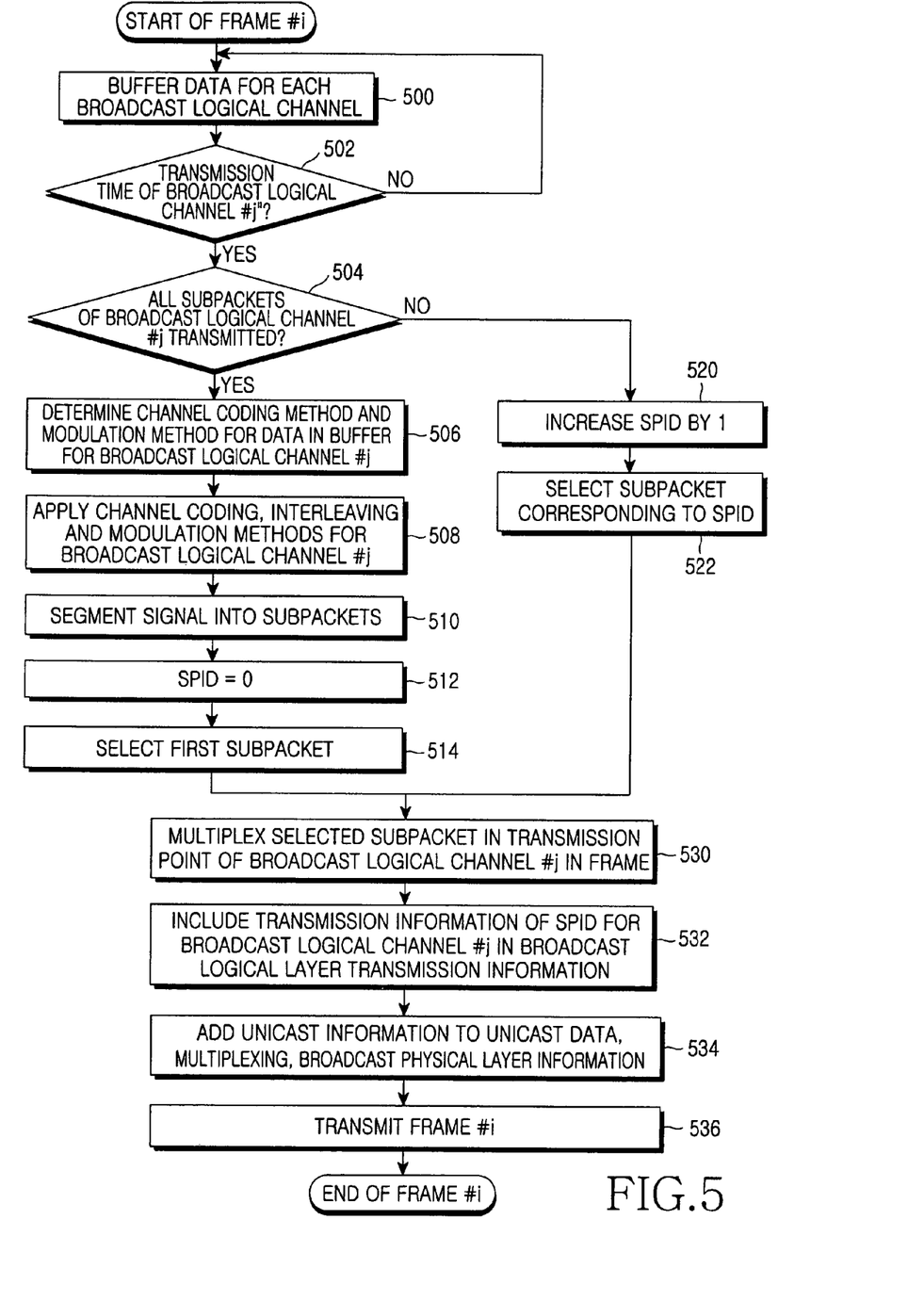
FIG. 5 is a flowchart illustrating a process of transmitting broadcast services in a base station according to an embodiment of the present invention.

FIG. 5 is a flowchart illustrating a process of transmitting broadcast services in a base station according to an embodiment of the present invention. With reference to FIG. 5, a description will now be made of a process of transmitting broadcast services in a base station according to an embodiment of the present invention.

FIG. 5 illustrates a base station's exemplary operation for independently generating and transmitting broadcast subpackets for broadcast logical channels on a per-frame basis according to an embodiment of the present invention. In the 802.16 system to which an embodiment of the present invention is applied, it is assumed that broadcast data transmitted with one CID comprises one broadcast logical channel.

Referring to FIG. 5, in step 500, a base station performs a buffering operation of storing broadcast data arriving thereat every frame in a buffer according to a logical channel. Thereafter, the base station performs a transmission preparation process of steps 502 to 532 on all of the broadcast logical channels transmitted by the base station. After performing the buffering operation, the base station determines in step 502 whether a particular broadcast logical channel #j must be transmitted at a frame #i. If it is determined that the frame #i is not a transmission time of the broadcast logical channel #j, the base station processes the next broadcast service or returns to step 500 where it continuously performs the buffering operation on the broadcast service.

If it is determined in step 502 that the frame #i is a transmission time of the broadcast logical channel #j, the base station determines in step 504 whether it has transmitted all of the previous transmission subpackets for a corresponding broadcast logical channel. This is done by determining whether a SPID of a corresponding broadcast logical channel is a MAX_SPID. That is, the base station determines whether it has transmitted previous transmission subpackets by checking whether SPID=MAX_SPID. If it is determined in step 504 that it has transmitted all of the previous subpackets for the corresponding broadcast logical channel, the base station prepares for transmission of the next broadcast packet through steps 506 to 514.

In step 506, the base station determines a channel coding method, an interleaving method, and a modulation method for the next broadcast packet stored in a buffer. In step 508, the base station applies the determined methods to the corresponding broadcast packet, i.e., performs channel coding, interleaving and modulation on the corresponding broadcast packet using the determined methods. Thereafter, in step 510, the base station segments the channel-coded, interleaved and modulated broadcast packet into a predetermined number of subpackets. In this embodiment, broadcast services are individually subject to channel coding, interleaving and modulation, as described with reference to FIG. 3. In step 512, the base station sets a SPID of the corresponding broadcast logical channel to 0. Thereafter, in step 514, the base station selects a first subpacket among the generated subpackets. Alternatively, the generation of subpackets in step 510 can be applied to a coded signal or a coded/interleaved signal. In this case, interleaving and modulation can be applied after generation of the subpackets.

After the steps of 506 to 514, the base station performs time and channel multiplexing on the selected broadcast subpacket at a predetermined position in step 530. In step 532, the base station includes broadcast physical layer transmission information for the corresponding broadcast logical channel #j in physical layer transmission information to be transmitted at the frame #i. This multiplexing is the same multiplexing described with reference to FIG. 3.

If it is determined in step 504 that the base station has not transmitted all of the broadcast subpackets for the corresponding broadcast logical channel #j, the base station increases a SPID of the corresponding broadcast logical channel by 1 in step 520. In step 522, the base station selects a subpacket corresponding to the increased SPID, and then proceeds to step 530.

After step 532, the base station proceeds to step 534 where if there is unicast data to be transmitted at the current frame #i and the current frame #i has room for transmission, the base station adds the corresponding unicast data to broadcast data, for multiplexing. Thereafter, the base station includes the multiplexed information and the broadcast information in the physical layer transmission information, thereby completing a frame #i including physical layer transmission information. In step 536, the base station transmits the completed frame, and then ends the process.

Next, a description will be made of a process of receiving a broadcast frame in a mobile station.

Figure 6:
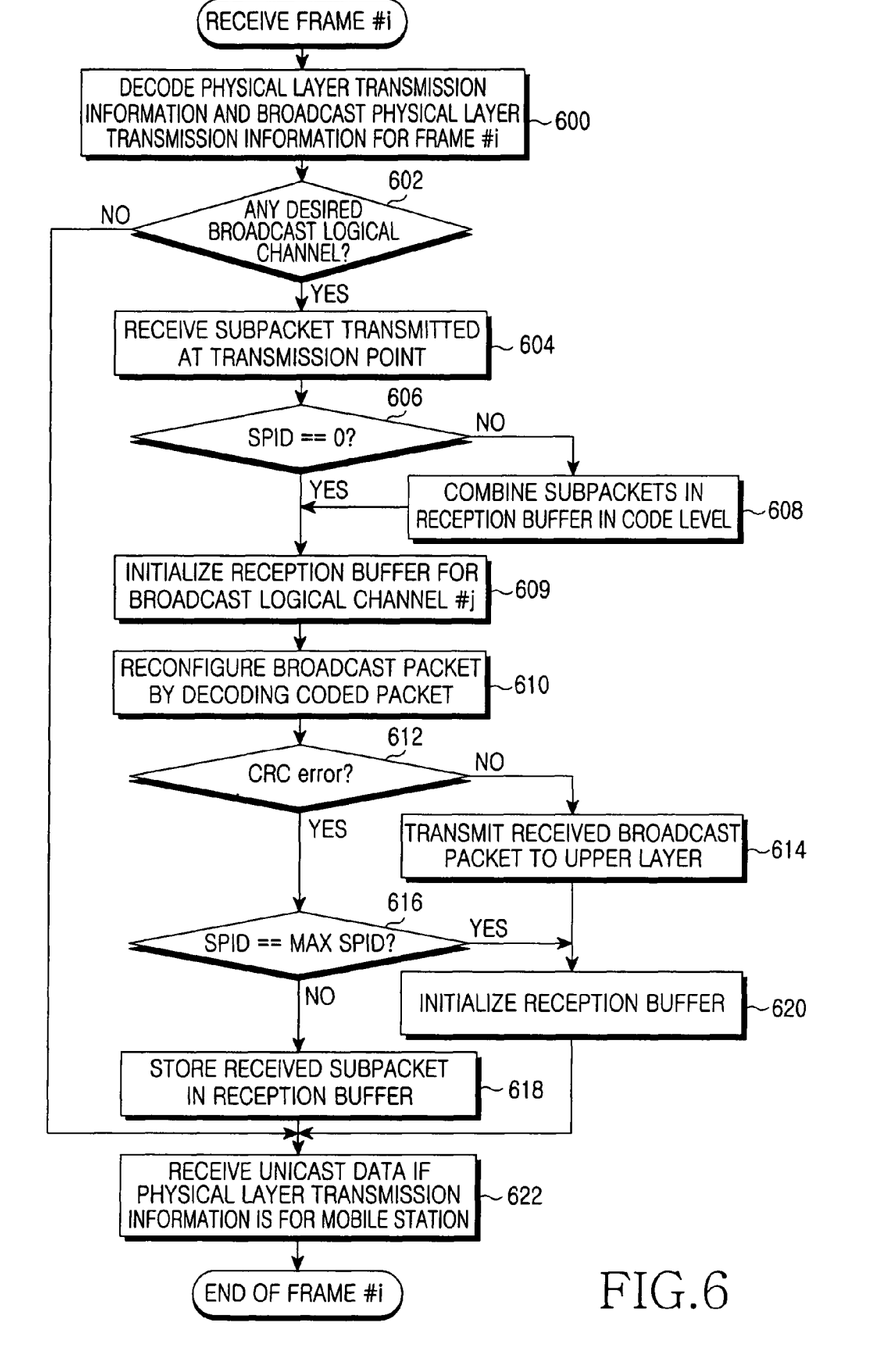
FIG. 6 is a flowchart illustrating a process of receiving broadcast services transmitted on a time division basis in a mobile station according to an embodiment of the present invention.

FIG. 6 is a flowchart illustrating a process of receiving broadcast services transmitted on a time division basis in a mobile station according to an embodiment of the present invention. With reference to FIG. 6, a detailed description will now be made of a process of receiving broadcast service data transmitted on a time division basis in a mobile station according to an embodiment of the present invention.

As described above, in the 802.16 system to which the present invention is applied, it is assumed that broadcast data transmitted with one CID comprises one broadcast logical channel.

Referring to FIG. 6, in step 600, a mobile station, receiving a frame #i at a predetermined time, receives physical layer transmission information and broadcast physical layer transmission information included in a frame, and decodes the received information. By acquiring the physical layer transmission information including the broadcast physical layer transmission information through the process, the mobile station can acquire a format of the current frame, a CID transmitted in the frame, and information on its transmission point. After acquiring the information, the mobile station determines in step 602 whether a broadcast logical channel to be received in a frame #i is included.

If it is determined in step 602 that the desired broadcast logical channel is included in the transmitted frame #i, the mobile station performs steps 604 to 620 on all of the desired broadcast logical channels included in the frame. A detailed description of each of the steps will now be described herein below.

In step 604, the mobile station receives (or performs demodulation and deinterleaving) a subpacket transmitted at a position of a desired broadcast logical channel #j in a frame based on the information written in broadcast physical layer transmission information for the desired broadcast logical channel #j. After receiving the subpacket of the broadcast logical channel #j, the mobile station analyzes in step 606 a SPID of the corresponding broadcast subpacket transmitted through the broadcast physical layer transmission information. Thereafter, the mobile station determines whether the subpacket is a first subpacket of the broadcast packet. If the subpacket is not a first subpacket, the mobile station performs, in step 608, a code level combining process with previous subpackets stored in a reception buffer for the corresponding logical channel #j. However, if the corresponding subpacket is a first subpacket, the mobile station empties the reception buffer for the broadcast logical channel #j in step 609. Thereafter, in step 610, the mobile station decodes the received first subpacket or the code-level-combined packet, thereby reconfiguring the original broadcast packet.

After the reconfiguration, the mobile station performs a CRC check on the reconfigured broadcast packet in step 612. Based on the CRC check result, the mobile station determines whether the corresponding packet has been successfully received. If it is determined in step 612 that there is no CRC error, the mobile station transmits the corresponding broadcast packet to an upper layer in step 614. In step 620, the mobile station empties the reception buffer for the broadcast logical channel #j which is a logical channel for the corresponding broadcast packet.

However, if it is determined in step 612 that there is a CRC error, the mobile station compares a SPID with a MAX_SPID in step 616 to determine whether the corresponding broadcast subpacket is the last subpacket. If the corresponding broadcast subpacket is not the last subpacket, the mobile station stores the received subpacket in the reception buffer for the corresponding broadcast logical channel #j in step 618. Otherwise, if it is determined in step 616 that the received subpacket is the last subpacket, the mobile station empties the reception buffer for the corresponding broadcast logical channel #j in step 620, determining that the subpacket of the corresponding broadcast packet is no longer transmitted. The method of determining whether the current subpacket is the last subpacket, performed in step 616, can be achieved by determining whether a received SPID has a maximum value. Although the SPID is used in the embodiment of the present invention, a change in AISN number can also be used as described above. Alternatively, both of them can also be used.

After processing all of the desired broadcast packets included in a frame #i, the mobile station proceeds to step 622 where it processes unicast data in the corresponding broadcast service and then ends the operation in the frame #i.

As can be understood from the foregoing description, the 802.16 wireless communication system providing broadcast services can acquire a time diversity effect for each of the broadcast services, thereby improving reception performance. In addition, by independently transmitting the broadcast services, it is possible to provide various qualities of the broadcast service, and a mobile station can selectively receive its desired broadcast service.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for providing a plurality of broadcast services in an orthogonal frequency division multiple access (OFDMA) wireless communication system, the method comprising the steps of:
    independently coding data for the broadcast services;
    segmenting the coded broadcast service data into a plurality of subpackets;
    generating broadcast physical layer transmission information including information indicating a connection identifier (CID) for identifying the broadcast service, a subpacket ID (SPID) for identifying the subpacket, and a subchannel offset for indicating a position where the subpacket is transmitted, for each of the broadcast services; and
    configuring a physical layer frame including at least one of the broadcast physical layer transmission information and a subpacket corresponding to the broadcast physical layer transmission information, and transmitting the physical layer frame.

2. The method of claim 1, wherein the physical layer transmission information comprises information on a transmission point of a broadcast service corresponding to each CID, the number of symbols, a start point of a frequency-domain channel, and the number of occupied subchannels in the physical layer frame.

3. The method of claim 1, wherein the broadcast physical layer transmission information further comprises ARQ Channel Identifier (ACID) information indicating the number of broadcast packets that can be consecutively transmitted for a broadcast service identified by the same CID.

4. The method of claim 3, further comprising ARQ Identifier Sequence Number (AISN) information indicating whether there is any change in a broadcast packet transmitted with the ACID.

5. A method for receiving a broadcast service in a wireless communication system in which two or more broadcast services are provided using an orthogonal frequency division multiple access (OFDMA) scheme, and information on the broadcast service including physical layer transmission information is transmitted for one physical layer frame, the method comprising the steps of:
    acquiring, from the physical layer transmission information included in the physical layer frame, a connection identifier (CID) for identifying the broadcast service, a subpacket ID (SPID) for identifying the subpacket, and a subchannel offset for indicating a position where the subpacket is transmitted, for each of the broadcast services;
    extracting a subpacket for a desired broadcast service from the physical layer frame using the acquired information; and
    decoding the extracted subpacket.

6. The method of claim 5, wherein the information on the position where the subpacket is transmitted is acquired from information on a transmission point of a broadcast service corresponding to each CID, the number of symbols, a start point of a frequency-domain channel, and the number of occupied subchannels, for the broadcast service included in the physical layer transmission information.

7. The method of claim 5, further comprising the steps of:
    if ARQ Channel Identifier (ACID) information indicating consecutive transmission for a broadcast service identified by the same CID is included in the physical layer transmission information, acquiring information on the number of consecutively transmitted broadcast packets, from the ACID information; and
    extracting a subpacket for the acquired broadcast packet and decoding the extracted subpacket.

8. The method of claim 7, further comprising the steps of:
    if broadcast packets are consecutively transmitted with the ACID information, acquiring ARQ Identifier Sequence Number (AISN) information indicating whether there is any change in the broadcast packet, from the physical layer transmission information; and
    detecting a change in the broadcast packet, if there is a change in the AISN information.

9. The method of claim 1, wherein the physical layer transmission information further comprises $N_{EP}$ indicating coding scheme and $N_{SCH}$ indicating modulation scheme for the subpacket.

10. The method of claim 5, wherein the physical layer transmission information further comprises $N_{EP}$ indicating coding scheme and $N_{SCH}$ indicating modulation scheme for the subpacket.

* * * * *